United States Patent
Adler et al.

(10) Patent No.: US 8,648,680 B2
(45) Date of Patent: Feb. 11, 2014

(54) ELECTROMAGNET

(75) Inventors: Bernhard Adler, Ulm (DE); Steffen Loritz, Ulm (DE); Matthias Stitz, Lohr am Main (DE); Torsten Witte, Lohr am Main (DE); Ralf Bosch, Boerslingen (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 13/126,985

(22) PCT Filed: Oct. 30, 2009

(86) PCT No.: PCT/EP2009/007782
§ 371 (c)(1),
(2), (4) Date: Oct. 18, 2011

(87) PCT Pub. No.: WO2010/049166
PCT Pub. Date: May 6, 2010

(65) Prior Publication Data
US 2012/0025938 A1    Feb. 2, 2012

(30) Foreign Application Priority Data

Oct. 31, 2008   (DE) .................. 10 2008 054 184
Feb. 7, 2009    (DE) .................. 10 2009 007 983

(51) Int. Cl.
*H01F 7/00*    (2006.01)
*H01F 7/08*    (2006.01)
*H01F 3/00*    (2006.01)

(52) U.S. Cl.
USPC .......................................... 335/278; 335/260

(58) Field of Classification Search
USPC .................................. 335/260, 278
See application file for complete search history.

(56) References Cited

U.S. PATENT DOCUMENTS

| | | | | |
|---|---|---|---|---|
| 2,964,286 A | * | 12/1960 | Hoskins | 251/30.04 |
| 3,670,274 A | * | 6/1972 | Ellison | 335/260 |
| 3,727,160 A | * | 4/1973 | Churchill | 335/251 |
| 4,055,823 A | | 10/1977 | Andersen | |
| 4,649,360 A | | 3/1987 | Riefler | |
| 4,791,960 A | * | 12/1988 | Ellison | 137/596.17 |

(Continued)

FOREIGN PATENT DOCUMENTS

| | | | |
|---|---|---|---|
| DE | 2359999 A | * | 6/1975 |
| DE | 8704132 | | 5/1987 |
| DE | 10220405 | | 11/2002 |
| DE | 102005039640 | | 3/2007 |

OTHER PUBLICATIONS

International Search Report corresponding to PCT Application No. PCT/EP2009/007782, mailed Feb. 9, 2010 (German and English language document) (6 pages).

*Primary Examiner* — Mohamad Musleh
(74) *Attorney, Agent, or Firm* — Maginot, Moore & Beck (57) ABSTRACT

An electromagnet having a pole tube, and having a coil that encompasses the pole tube and is mounted so as to be displaceable along a longitudinal axis of the pole tube, a first end face of the coil or of the housing thereof bearing on a first counter-bearing disposed at a first end portion of the pole tube, and an elastic element, which is supported on a second counter-bearing and biases the coil and/or the housing thereof against the first counter-bearing, is provided between a second end face of the coil or the housing thereof and the second counter-bearing disposed at a second end portion of the pole tube.

11 Claims, 5 Drawing Sheets

(56) References Cited

U.S. PATENT DOCUMENTS

| | | |
|---|---|---|
| 4,805,870 A | 2/1989 | Mertz |
| 6,036,167 A * | 3/2000 | Wade .................. 251/30.04 |
| 6,405,746 B2 * | 6/2002 | Harms et al. .................. 137/14 |
| 6,628,186 B1 * | 9/2003 | Wolfges .................. 335/220 |
| 7,036,788 B1 * | 5/2006 | Schneider et al. .............. 251/86 |
| 2003/0084882 A1 * | 5/2003 | Kabat et al. .................. 123/490 |
| 2006/0180783 A1 * | 8/2006 | Tackes et al. ............ 251/129.15 |

\* cited by examiner

ELECTROMAGNET

This application is a 35 U.S.C. §371 National Stage Application of PCT/EP2009/007782, filed Oct. 30, 2009, which claims the benefit of priority to both (i) Serial No. 10 2008 054 184.2, filed Oct. 31, 2008 in Germany, and (ii) Serial No. 10 2009 007 983.1, filed Feb. 7, 2009 in Germany, the disclosures of the three (3) above-identified patent applications which are incorporated herein by reference in their entirety.

BACKGROUND

The disclosure relates to an electromagnet as set forth below.

Electromagnets are known wherein a magnet coil is pushed onto a pole tube. The magnet coil is held on the pole tube by means of a nut, made of plastic or of metal, that is screwed onto a thread of the pole tube.

Such a magnet arrangement is disclosed in the publication DE 102 20 405 A1.

A plastic nut cannot be set in a secure manner, and is sensitive to temperature. A metal nut frequently cannot be tightened with the torque necessary for metal, and is therefore also not secure against working loose.

In the case of the electromagnet being used as an actuator for a hydraulic valve and, in particular, in the case of use in rough conditions such as, for example, on a mobile work device, the nut frequently is not tightened with the required torque. As a result, the magnet coil can work loose from the pole tube.

SUMMARY

Against this, the disclosure is based on the object of creating an electromagnet whose magnet coil is held securely on the pole tube, even in the case of vibrations, temperature fluctuations, extreme temperatures and humidity or corrosion, and can be easily released at any time from the pole tube when intended.

This object is achieved by an electromagnet as set forth below.

Further advantageous designs of the disclosure are described are set forth below as well.

The electromagnet according to the disclosure has a pole tube, and has a coil that encompasses the pole tube and is displaceable along a longitudinal axis of the pole tube. In this case, a first end face of the coil bears on a first counter-bearing attached to a first end portion of the pole tube. Furthermore, an elastic element, which is supported on a second counter-bearing and biases the coil against the first counter-bearing, is provided between a second end face of the coil and the second counter-bearing disposed with a second end portion of the pole tube. There is achieved as a result, against temperature fluctuations and even vibrations, a permanent and constantly tensioned attachment of the coil on the pole tube that is secure against working loose and that can be easily released at any time for the purpose of demounting, even after a relatively long exposure to humidity.

In a preferred exemplary embodiment, the electromagnet serves for actuating a valve body of a hydraulic valve, the first counter-bearing being an outer wall of a valve housing connected to the first end portion of the pole tube. In the case of this exemplary embodiment, it is usual for the first end portion to be attached to the housing of the hydraulic valve to be actuated (e.g. by screwing-in), such that the outer wall can be utilized, without an additional production resource requirement, as a first counter-bearing for the actuation magnet.

In this case, the abovementioned advantages are of particular use if the hydraulic valve is disposed on a mobile work device.

In the case of a particularly preferred exemplary embodiment, the second counter-bearing is a side flank of an annular groove of the pole tube. Particularly in the case of a free second end portion of the pole tube, the second counter-bearing can thus be constituted with simple means.

In the case of a preferred variant, the elastic element is a disk spring, which is supported on a retaining ring inserted in the annular groove. The retaining ring can be easily removed from the annular groove, whereupon the relieved disk spring, and subsequently the coil, can be demounted easily.

In the case of another preferred variant, the elastic element is a wire clip, which has at least one groove portion accommodated in the annular groove. This variant requires a minimal amount of equipment and production resources, since the wire clip can be easily bent, and subsequently is likewise easily mounted and demounted.

In the case of a preferred variant of the wire clip, the latter is approximately mirror-symmetrical in shape and has two groove portions bearing on the flank of the annular groove, and has four coil portions bearing on the second end face of the coil. This ensures that the wire clip is held securely in the annular groove of the pole tube. In addition, a uniform application of force is achieved and, consequently, displacement of the pole tube against the first counter-bearing without catching.

In the case of another preferred variant of the wire clip, the latter is likewise approximately mirror-symmetrical in shape and has two groove portions bearing on outer flanks and parallel groove bases of the double groove. The wire clip in this case has four coil portions that each go into a groove of the second end face of the coil. A lock against rotation is thereby created, such that the coil is held in a predefined position on the pole tube.

For optimal securing, the wire clip, by means of its free ends, can engage behind the pole tube.

In the case of both variants, a sealing ring can be provided between the pole tube and the coil, for the purpose of sealing an annular gap, which sealing ring is biased against the second end face by the elastic element.

For reasons of support, or uniform force distribution, of the sealing ring, an annular disk should be disposed between the wire clip and the sealing ring.

In the case of a further preferred variant, the elastic element is a ring (e.g. made of rubber), which is supported on a retaining ring inserted in the annular groove. This variant, likewise, requires a minimal amount of equipment and production resources, since the ring is easy to produce, and subsequently can be easily mounted or demounted by pushing up or down over the second end portion of the pole tube, and is easily fixed in position by the retaining ring.

The elastic ring also can be disposed in the (correspondingly widened) annular groove, in addition to the retaining ring. In this case, a groove base portion of the annular groove in the region of the elastic ring can have a greater diameter than the diameter of a groove base portion in the region of the retaining ring.

To enable deviations of length and differing dimensions between the pole tube and the coil to be tolerated, the annular groove should be covered, to a small extent, by a housing of the coil.

In the case of a particularly preferred development of the electromagnet according to the disclosure, there is provided, as a lock against rotation, a toothing constituted between an outer circumferential surface portion of the pole tube and an inner circumferential surface portion of the coil. As a result, the electrical connections of the coil remain at the intended location on the outer circumferential surface of the coil even, for example, after prolonged vibration.

In the case of the variant having the disk spring, there is preferably provided, as a lock against rotation, a toothing constituted between an outer circumferential surface portion of the pole tube and an inner circumferential portion of the disk spring and, furthermore, a toothing constituted between a bearing contact portion of the disk spring and the second end face of the coil. Such a two-stage toothing, likewise, enables the electrical connections of the coil to remain at the intended location even, for example, after prolonged vibration.

In the case of both locks against rotation, there are projections and/or grooves, which are distributed in a uniform manner on the circumference of the outer circumferential surface portion of the pole tube and which are disposed in the region of the second end portion of the pole tube and substantially parallelwise in relation to the longitudinal axis thereof.

The toothing is preferably constituted, between the bearing contact portion of the disk spring and the second end face of the coil, by radial recesses of the end face and by corresponding radial projections of the bearing contact portion, or by radial projections of the end face and by corresponding radial recesses of the bearing contact portion. The recesses and projections in this case can be distributed in a uniform manner on the respective circumference.

As stated, a particularly preferred development provides that the disk spring simultaneously serves as a lock against rotation, i.e. that the disk spring, the second end portion of the pole tube and the coil housing are realized such that, when in the mounted state, the coil housing, by means of the disk spring, is supported at said end portion, against a rotation. The disk spring therefore has a double function. The coil housing and the end portion of the pole tube can have a simple geometric shape that is easy to produce. The possibly more complex shape of the disk spring can be produced inexpensively by, for example, stamping or press-forming.

Preferably, the second end portion has one or more key surfaces, in particular the second end portion being realized in the form of a cylinder having a polygonal, possibly rounded, in particular hexagonal, in particular octagonal basic surface. That is to say, the second end portion corresponds, for example, to a rounded hexagon or to a rounded octagon. The central, inner opening of the disk spring is realized so as to correspond to the cross-sectional surface of the end portion, such that in the circumferential direction the disk spring is supported positively on the end portion. This form of the second end portion and of the opening of the disk spring can be produced particularly inexpensively.

Preferably, edges of the one or more key surfaces are breached by respectively one groove portion extending in the circumferential direction on the outer circumferential surface of the second end portion. Only a small amount of material is removed. If the groove portions constitute an annular groove, interrupted in the circumferential direction, for receiving the retaining ring, and if in particular the annular groove is interrupted in the center of the key surface, a web remains in the center of the key surface, on which web the disk spring can be pushed into its mounted position without falling into the groove.

Preferably, the disk spring has, at its peripheral portion that bears on the coil housing, at least one radial and/or axial projection, in particular at least one tab projecting radially and axially, the projection engaging in a hollow of the coil housing. Such a disk spring can be easily produced as a stamped part or press-formed part.

BRIEF DESCRIPTION OF THE DRAWINGS

Various exemplary embodiments of the disclosure are described in detail in the following with reference to the figures, wherein.

DETAILED DESCRIPTION

Figure 1:
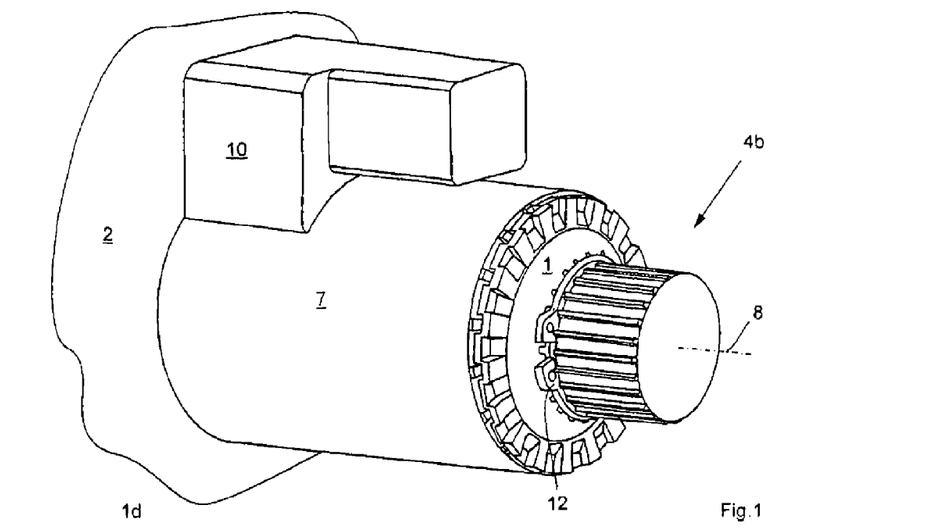
FIG. 1 shows a perspective view of a first exemplary embodiment of an electromagnet according to the disclosure, having a disk spring.

FIG. 1 shows a perspective view of a first exemplary embodiment of an electromagnet according to the disclosure, having a disk spring 1. The electromagnet serves to actuate a hydraulic valve, of which only a part of the valve housing 2 is represented in FIG. 1.

The electromagnet has an approximately circular cylindrical pole tube 4, which is attached to the valve housing 2 and, moreover, enters the wall portion shown in FIG. 1. Disposed at the outer circumference of the pole tube 4 is a likewise approximately circular cylindrical, tubular coil, of which the coil housing 7 can be seen in FIG. 7. The coil, or its coil housing 7, is displaceable (at least to a large extent) along a longitudinal axis 8 of the pole tube 4.

The coil housing 7 bears with its (in FIG. 1) left end face on the outer wall portion of the valve housing 2.

Provided on the outer circumferential surface of the coil housing 7 (at the top in FIG. 1) is a switch housing 10, inside which are disposed electrical connections (not shown) for supplying the coil.

According to the disclosure, the coil housing 7 is biased to the left (in FIG. 1), against the valve housing 2, by means of the disk spring 1, and thus fixed at the corresponding position along the longitudinal axis 8 of the pole tube 4. The disk spring 1 in this case is supported to the right (in FIG. 1) against a retaining ring 12, which is inserted in an annular groove 5 of the pole tube 4.

Figure 2:
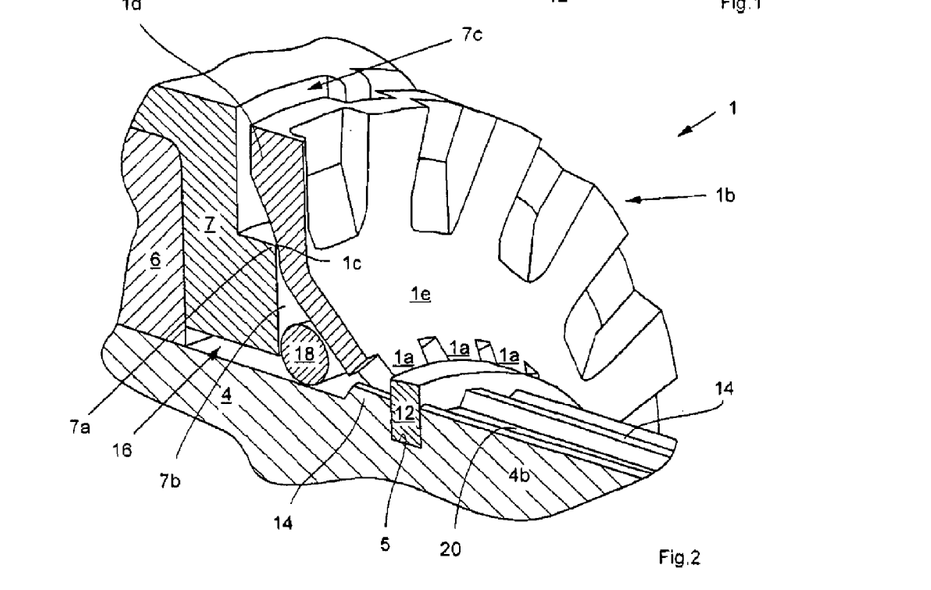
FIG. 2 shows a portion of a perspective longitudinal section of the first exemplary embodiment according to FIG. 1.

FIG. 2 shows a portion of a perspective longitudinal section of the first exemplary embodiment according to FIG. 1.

The windings of the coil 6 are accommodated inside the coil housing 7. Upon application of current to the coil 6, a core, or magnet armature, (not shown) disposed inside the pole tube 4 can be subjected to force and displaced along the longitudinal axis 8. According to the prior art, a valve body (not shown) is thereby shifted. The valve, on whose housing 2 the magnet according to the disclosure is mounted, can thus be operated.

The disk spring 1 has projections, or feet, 1a that are distributed in a uniform manner on the inner circumference and whose cross-sectional surfaces have approximately the shape of an equilateral trapezoid. Each foot 1a goes portionally into an assigned longitudinal groove, or axial groove, 20 of the pole tube 4. The axial grooves 20 are disposed between axial projections 14 constituted on the outer circumference of the pole tube 4. At the second end portion 4b of the pole tube 4, the projections 14 extend parallelwise in relation to the longitudinal axis 8 of the pole tube 4 (cf. FIG. 1). In cross-section, the projections 14 in this case have the shape of an equilateral trapezoid.

On the outside, the disk spring 1 has a circumferential bearing contact portion 1b, which, via a multiplicity of pressure points 1c distributed uniformly on the circumference, bears on the coil housing 7 and biases the latter, in the manner previously described, to the left (in FIG. 2) against the valve housing 2 (not shown in FIG. 2). In this case, the pressure points 1c on the disk spring side bear on edges 7a on the coil side that are likewise provided in a uniform manner on the circumference of a second end face 7b of the coil housing 7. Each edge 7a is an inner boundary of a radial recess 7c of the second end face 7b. Accordingly, the radial recesses 7c are likewise distributed in a uniform manner on the circumference of the second end face 7b of the coil housing 7, each having the shape of an equilateral trapezoid in the direction of view perpendicular to the second end face 7b.

Corresponding projections 1d of the disk spring 1, which, on the coil side, are realized on the bearing contact portion 1b of the disk spring 1, go into the recesses 7c of the coil housing 7. The projections 1d in this case have somewhat lesser dimensions than the recesses 7c, such that the thus constituted toothing can mesh in a frictionless manner upon assembly.

Furthermore, the feet 1a of the disk spring 1 together with the axial projections 14 of the pole tube 4 likewise constitute a toothing, such that a (two-stage) lock against rotation is thereby created between the pole tube 4 and the coil housing 7, together with the coil 6.

An annular gap 16 can remain between the coil housing 7 and the pole tube 4. This annular gap is sealed by a sealing ring, or O-ring, 18, which is pressed against the annular gap 16 by a central cone portion 1e of the disk spring 1.

According to the disclosure, the disk spring 1 causes the coil housing 7, together with the coil 6, to be fixed in position on the pole tube 4 (cf. FIG. 2), the fixing in position being effected through bracing against the valve housing 2.

Furthermore, the toothing 1a, 14, according to the disclosure, between the disk spring 1 and the pole tube 4 and the toothing 1d, 7c between the disk spring 1 and the coil housing 7 create a lock against rotation, such that the switch housing 10 remains permanently at the predefined location (cf. FIG. 1), even when subjected to rough conditions and prolonged vibration.

Figure 3:
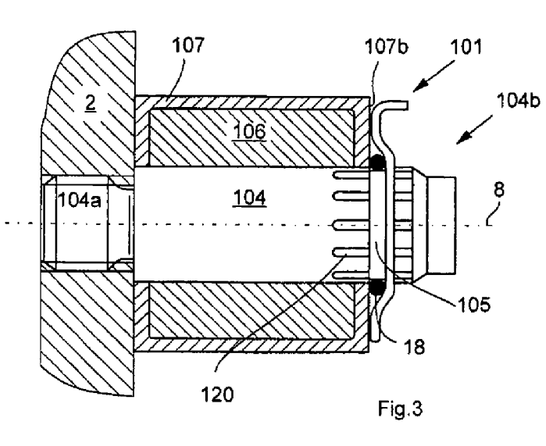
FIG. 3 shows a lateral section of a second exemplary embodiment of an electromagnet according to the disclosure, having a wire clip.

FIG. 3 shows a lateral section of a second exemplary embodiment of an electromagnet according to the disclosure. The essential difference of the second exemplary embodiment compared with the first exemplary embodiment consists in that the disk spring 1 and the retaining ring 12 are replaced by a wire clip 101.

At its first end portion 104a, the pole tube 104 has an outer thread, via which the pole tube 104 is screwed into a through opening of the valve housing 2.

Realized at the second end portion 104b of the pole tube 104 are axial grooves 120 that, unlike the case of the first exemplary embodiment, are constituted, not by adjacent axial projections, but by hollows. For the purpose of realizing a toothing, in the region of the inner circumference on the right (in FIG. 3) the coil housing 107 has corresponding projections (not shown), which, together with the axial grooves 120, constitute a lock against rotation between the coil housing 107 and the pole tube 104.

The second end portion 104b of the pole tube 104 projects over the coil 107 and, at the level of the second end face 107b of the coil 107, has an annular groove 105.

In the region of this annular groove 105, the resilient wire clip 101, which is open on one side, is pushed over the annular groove, perpendicularly in relation to the axis 8 of the pole tube 104. The wire clip 101 is supported, on the one hand, via its two groove portions 101a, on the one side of the annular groove 105 of the pole tube 104 and, on the other hand, on both sides of the pole tube 104, on the coil housing 107, and thereby presses the latter against the valve housing 2. In this case, four coil portions 101b of the wire clip 101 that are distributed on the circumference bear on the end face 107b of the coil housing 107. The coil housing 107, and consequently the coil 106, is thereby fixed in position axially on the pole tube 104.

In order for the wire clip 101 to hold in a particularly secure manner, it encompasses the pole tube 104 by means of its free ends.

The pole tube 104 and the coil housing 107 are each provided with a toothing, the toothings meshing in one another, such that the coil housing 107, together with the coil 106, and the pole tube 104 are locked against rotation in relation to one another. In the present case, the toothing on the coil housing 107 extends inwards, from the second end face 107b thereof, over a certain distance. The toothing 120 on the pole tube 104 is located on both sides of the annular groove 105.

A sealing ring 18, which seals the gap between the pole tube 104 and the coil housing 107, is placed under the wire clip 101, in the region of the annular groove 105.

In order to achieve a uniform pressure force of the sealing ring 18 against the gap to be sealed, an annular disk (not shown) is inserted between the sealing ring 18 and the wire clip 101. The disk can also be realized in the form of a cone or frustum, and have a shape that corresponds largely to that of the cone portion 1e of the disk spring 1 of the first exemplary embodiment.

Figure 4:
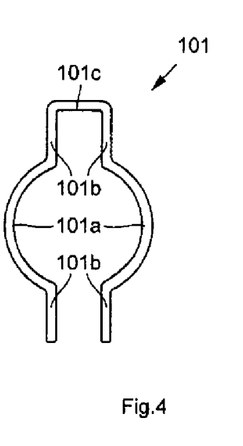
FIG. 4 shows a view of the wire clip of the second exemplary embodiment according to FIG. 3.

FIG. 4 shows a view of the wire clip 101 of the second exemplary embodiment according to FIG. 3. It is bent from a continuous wire and is mirror-symmetrical in relation to a central axis (not shown). The wire clip 101 has a connection portion 101c that, when fitted, bears neither on the second end face 107b of the coil housing 7 nor on the annular groove 105 of the pole tube 104.

Disposed at an angle of approximately 90° to the connection portion 101c are the two coil portions 101b, which, when the wire clip 101 has been inserted, bear resiliently on the (in FIG. 3) upper region of the second end face 107b of the coil housing 107.

Connected to the coil portions 101b are the two arc-shaped groove portions 101a, whose radii correspond approximately to that of the pole tube 104. Thus, when the wire clip 101 has been fitted, the two groove portions 101a bear oppositely and portionally on the (in FIG. 3) right side flank of the annular groove 105.

The two groove portions 101a are adjoined, respectively, by a further coil portion 101b, which are approximately in alignment with the abovementioned coil portions 101b. Thus, in the assembled state, the lower coil portions 101b of the wire clip 101 also bear resiliently on the second end face 107b of the coil body 107.

The second exemplary embodiment of the electromagnet according to the disclosure likewise constitutes a secure and easily releasable connection between the coil 106, or coil housing 107, and the pole tube 104. Through simple upward withdrawal of the wire clip 101 (in FIGS. 3 and 4) and removal of the sealing ring 18 to the right (in FIG. 3), the coil 106, together with the coil housing 107, can be drawn off to the right (in FIG. 3). In this case, the projections (not shown) of the coil body 107 are guided along and out of the axial grooves 120 of the pole tube 104.

Figure 5:
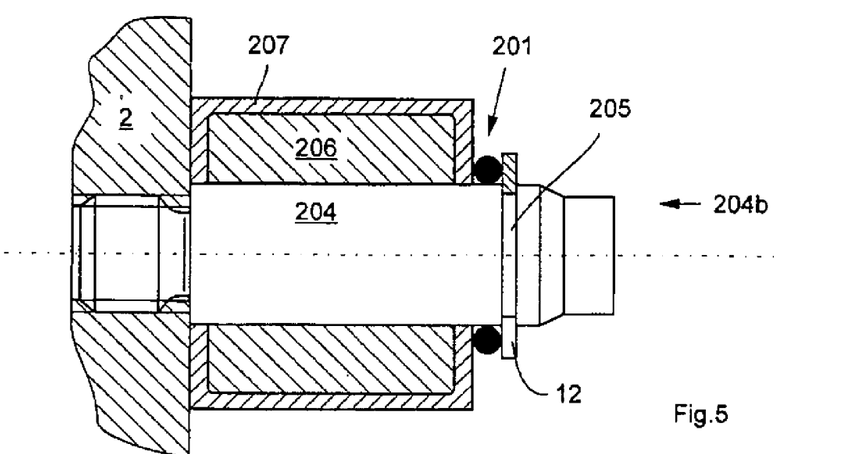
FIG. 5 shows a lateral section of a third exemplary embodiment of an electromagnet according to the disclosure, having an elastic ring.

FIG. 5 shows a lateral section of a third exemplary embodiment of an electromagnet according to the disclosure, having an elastic ring 201. In contrast to the second exemplary embodiment (according to FIGS. 3 and 4), no lock against rotation is provided in the case of the third exemplary embodiment. The pressure force of the coil housing 207 against the valve housing 2 is produced by the elastic ring 201, which is disposed on the outer circumference of the pole tube 204. In this case, the elastic ring 201 is supported to the right (in FIG. 5) on the retaining ring 12. The retaining ring 12 is supported to the right (in FIG. 5) on a side flank of the annular groove 205.

Thus, according to the disclosure, the elastic ring 201 biases the coil 206, or the coil housing 207, to the left (in FIG. 5) against the valve housing 2, and at the same time seals a possibly remaining annular gap between the coil housing 207 and the pole tube 204.

Owing to the particularly simple structure, the resource requirement for production, mounting and demounting is minimal in the case of the third exemplary embodiment shown in FIG. 5.

Figure 6:
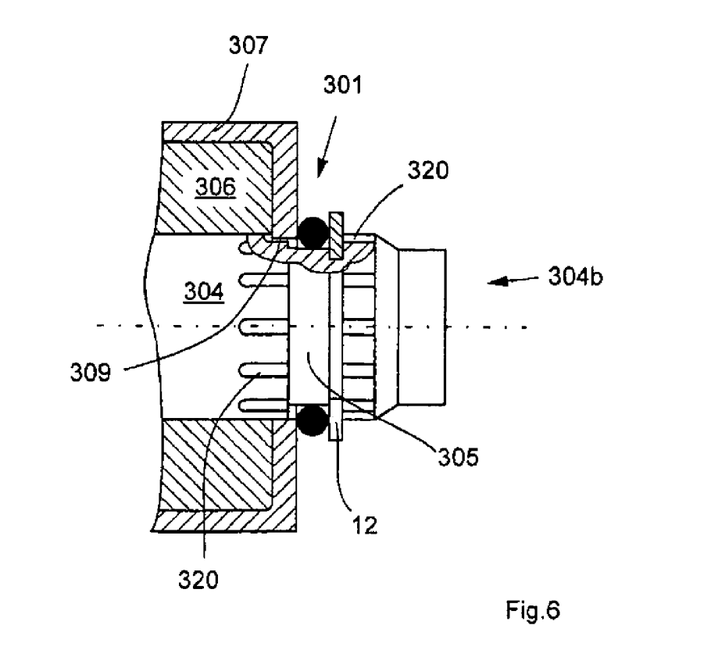
FIG. 6 shows a lateral section of a portion of a fourth exemplary embodiment of an electromagnet according to the disclosure, having an elastic ring.

FIG. 6 shows a portion of a fourth exemplary embodiment of an electromagnet according to the disclosure. This exemplary embodiment constitutes a modification of the third exemplary embodiment according to FIG. 5, the essential differences consisting in that a lock against rotation is provided, and the elastic ring 301 is accommodated in the annular groove 305.

The lock against rotation of the fourth exemplary embodiment is in principle comparable to that of the second exemplary embodiment according to FIG. 3, FIG. 6 showing a projection 309 of the coil housing 307, which engage in the corresponding axial groove 320 of the pole tube 304. Since the projections 309 are disposed in a uniform manner on the inner circumference of the coil housing 307, and since they engage in the axial grooves 320 disposed in a uniform manner on the outer circumference of the second end portion 304b of the pole tube 304, a lock against rotation is achieved.

The second difference of the fourth exemplary embodiment (according to FIG. 6) in comparison with the third exemplary embodiment (according to FIG. 5) is the two-stage annular groove 305, the groove region of the retaining ring 12 having a lesser diameter than the groove region in which the elastic ring 301 is accommodated.

In order that the biasing force of the elastic ring 301 that is directed to the left (in FIG. 6) also acts upon the coil housing 307 despite any production inaccuracies, the distance of the housing wall (not shown) of the valve from the (in FIG. 6) left side flank of the annular groove 305 should be designed so as to be less than the extent of the coil housing 307 along the longitudinal axis 8.

Figure 7:
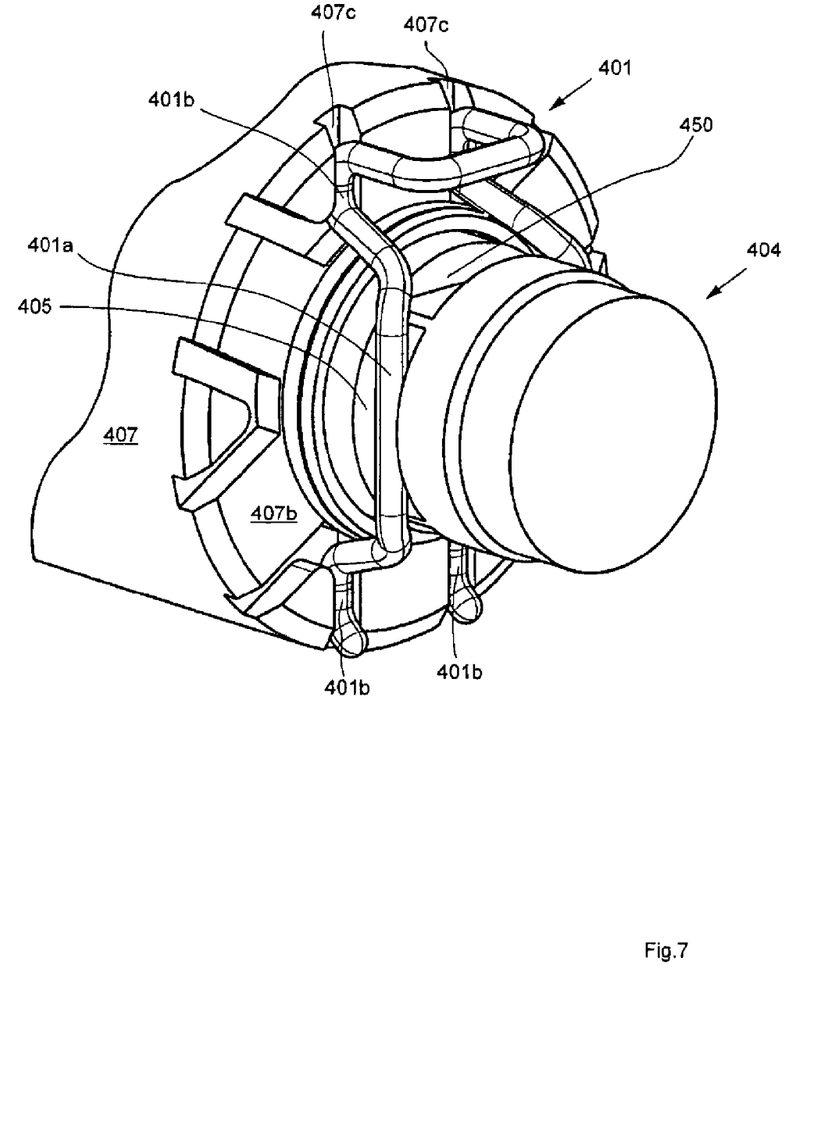
FIG. 7 shows a perspective view of a portion of a fifth exemplary embodiment of an electromagnet according to the disclosure, having a wire clip.

FIG. 7 shows a perspective view of a portion of a fifth exemplary embodiment of an electromagnet according to the disclosure, having a wire clip 401. The wire clip 401 has basic similarities to the wire clip 101 of the second exemplary embodiment. Unlike the latter, the wire clip 401 has two, not arc-shaped (cf. FIG. 4), but two substantially straight groove portions 401a. Realized on the pole tube 404 there are, instead of the annular groove 105 (cf. FIG. 3), two double grooves 405, 450, whose groove bases are approximately straight and disposed, in pairs, parallelwise in relation to one another. Of each double groove 405, 450, only one groove 405, 450 is represented in FIG. 7.

The essential difference between the second and the fifth exemplary embodiment consists in that the lock against rotation of the fifth exemplary embodiment extends, or is effected, via the wire clip 401. For this purpose, four coil portions 401b of the wire clip 401 go into respectively one groove 407c of the second end face 407b of the coil housing 407. At the same time, the two groove portions 401a of the wire clip 401 go into the two grooves of the double groove 405 of the pole tube 404. There is thus achieved a lock against rotation that holds the coil housing 407, together with the coil, approximately in the predefined position on the pole tube 404. In this case, the four grooves 407c, the two grooves of the double groove 405 and the two groove portions 401a are disposed approximately parallelwise in relation to one another.

The second double groove 450, rotated by 90° in relation to the first double groove 405, renders possible, with the wire clip 401 on the pole tube 404, a position of the coil housing 407 rotated by 90° in relation to the position shown.

Moreover, it is also possible for three double grooves to be provided on the circumference of the pole tube 404.

Unlike the first, second and fourth exemplary embodiments, the locks against rotation need not be constituted by toothings realized uniformly on the circumference; it would also be possible, for example, for only one hollow and a corresponding projection (for example, a feather key with a feather-key groove) to be provided.

Figure 8:
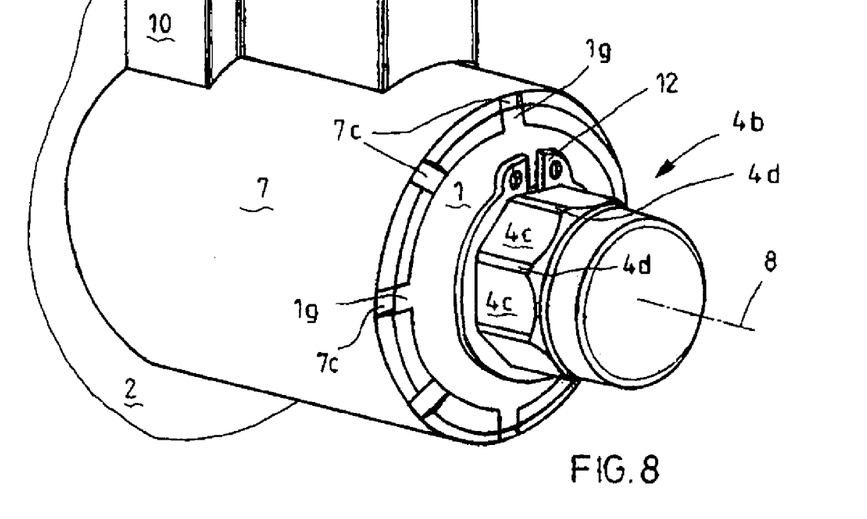
FIG. 8 shows a perspective view of a sixth exemplary embodiment of an electromagnet according to the disclosure, having a disk spring, as a production-optimized modification of the first exemplary embodiment.
Figure 9:
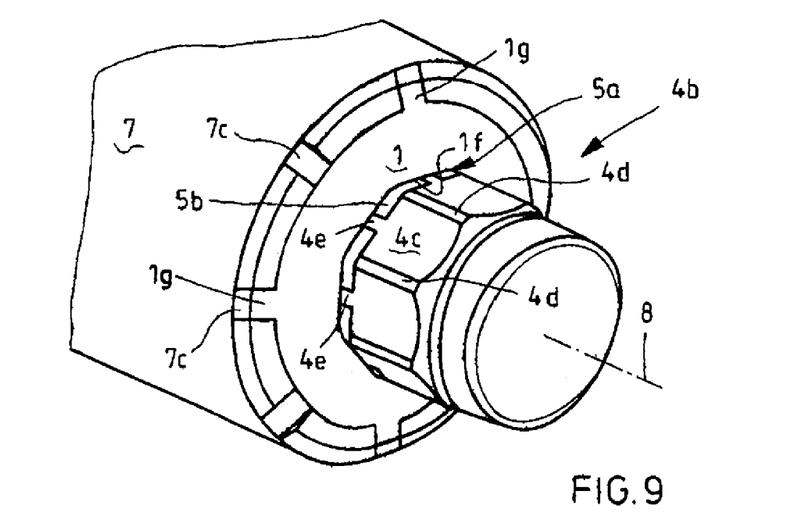
FIG. 9 shows an enlarged end portion of the electromagnet having a disk spring according to FIG. 8, wherein a snap ring has been demounted.

FIG. 8 and FIG. 9 show a perspective view of a sixth exemplary embodiment of an electromagnet according to the disclosure, having a disk spring 1. In many features, the sixth exemplary embodiment corresponds to the first exemplary embodiment. Modifications have been made to the second end portion 4b of the pole tube 4, to the disk spring 1 and to the coil housing 7. In comparison with FIG. 8, in the representation of FIG. 9 a snap ring 12 has been demounted to better illustrate the disk spring 1 and an annular groove 5a.

The pole tube 4 attached to the valve housing 2 carries the coil housing 7, which is pushed onto the pole tube. The coil housing 7 bears on the valve housing 2. The end portion 4b of the pole tube 4 that projects relative to the coil housing 7 is realized as a rounded octagon. This means that key surfaces 4c are sunk-in at the end portion 4b relative to a round, circular cylindrical main portion of the pole tube 4.

The rounded, axially extending edges 4d between the key surfaces 4c are breached in the circumferential direction by portions 5b of a circumferential, interrupted annular groove 5a. The annular groove 5a is in each case interrupted in the center of the key surface 4c by a type of axially aligned web 4e. There, starting from a notional, cylindrical outer circumferential surface of the end portion 4b, the sink-in depth of the key surface 4c is greater than the depth of the annular groove 5a.

The disk spring 1 is realized substantially as a conical disk. It has a central opening 1f, which has an octagonal shape. The opening if is fashioned to correspond in shape and size to the end portion 4b, i.e. the opening if is selected such that the disk spring 1 can be pushed onto the end portion 4b with minimal radial play. The webs 4e in this case allow the disk spring 1 to be pushed over the annular groove 5a without the disk spring 1 falling into the annular groove 5a. This facilitates assembly considerably.

The disk spring 1 has tabs 1g, which project both radially and axially, in continuation of the cone direction of the disk spring 1, at the outer periphery of the disk spring 1. On the coil housing 7, recesses 7c, which, owing to their dimensions and alignment, accommodate the tabs 1g of the disk spring 1, are sunk-in in the outer circumferential edge that faces toward the second end portion 4b.

During mounting, the coil housing 7 is pushed onto the pole tube 4. The disk spring 1 is then pushed onto the second end portion 4b of the pole tube 4 until it bears on the coil housing 7 and the tabs 1g engage in the recesses 7c. The disk spring 1 is then pressed in somewhat, if necessary by means of the snap ring 12, which is pushed on after the disk spring 1 until it engages in the annular groove 5a.

In a manner similar to the preceding embodiments, the bearing contact of the coil housing 7 on the valve housing 2 serves as a first counter-bearing, and the snap ring 12 serves as a second counter-bearing, together with the disk spring 1, which holds the coil housing 7 in bearing contact on the valve housing 2, for the purpose of axially fixing the position of the coil housing 7 on the pole tube 4. Moreover, by means of form-closure elements together with the disk spring 1, the coil housing 7 is supported on the pole tube 4, against a rotary movement. The form-closure elements in this case are the recesses 7c on the coil housing 7, the tabs 1g on the disk spring 1, the polygonal shape of the inner opening 1f of the disk spring 1 and the corresponding polygonal shape of the second end portion 4b of the pole tube 4.

There is disclosed an electromagnet having a pole tube, and having a coil that encompasses the pole tube and is displaceable along a longitudinal axis of the pole tube. In this case, a first end face of the coil bears on a first counter-bearing connected to a first end portion of the pole tube. According to the disclosure, an elastic element, which is supported on a second counter-bearing and biases the coil against the first counter-bearing, is disposed between a second end face of the coil and the second counter-bearing connected to a second end portion of the pole tube. There is achieved as a result, against temperature fluctuations and even vibrations, a permanent and constantly tensioned attachment of the coil on the pole tube that can be easily released even after a relatively long exposure to humidity.

The exemplary embodiments and figures described above serve only to improve understanding of the present disclosure, and do not, for instance, limit the disclosure to the exemplary embodiments. The figures are to some extent kept roughly schematic, the effect or the effects being in part represented in a significantly enlarged, or exaggerated, manner, in order to elucidate the modes of functioning, operating principles, technical designs and features. In principle, each mode of functioning, each principle, each technical design and each feature that is/are shown in the figures or in the text can be freely and optionally combined with all claims, each feature in the text and in the other figures, other modes of functioning, principles, technical designs and features that are contained in or ensue from this disclosure, such that all conceivable combinations are to be included in the scope of disclosure of the disclosure. Also included in this case are combinations between all individual statements in the text, i.e. in each portion of the text of the description, in the claims, and also combinations between differing exemplary embodiments in the text, in the claims and in the figures.

In addition, the claims do not restrict, or limit, the disclosure and thereby the possibilities for combination of all indicated features with one another. This disclosure also explicitly includes all indicated features, individually and in combination with all other features of the disclosure.

LIST OF REFERENCES 1 disk spring
1a foot
1b bearing contact portion
1c pressure point
1d projection
1e cone portion
1f opening
1g tab
2 valve housing
4; 104; 204; 304; 404 pole tube
4b; 104b; 304b second end portion
4c key surface
4d edge
4e web
5; 105; 205; 305 annular groove
6; 106; 206; 306 coil
7; 107; 207; 307; 407 coil housing
7a edge
7b; 107b; 407b second end face
7c recess
8 longitudinal axis
10 switch housing
12 retaining ring
14 axial projection
16 annular gap
18 sealing ring
20; 120; 320 axial groove
101; 401 wire clip
101a; 401a groove portion
101b; 401b coil portion
101c connection portion
104a first end portion
201; 301 elastic ring
309 projection
405; 450 double groove
407c groove

The invention claimed is:

1. An electromagnet having a pole tube, and having a coil that encompasses the pole tube and is mounted so as to be displaceable along a longitudinal axis of the pole tube, a first end face of the coil or of a housing thereof bearing on a first counter-bearing disposed at a first end portion of the pole tube, and an elastic element, which is supported on a second counter-bearing and biases the coil and/or the housing thereof against the first counter-bearing, the elastic element being provided between a second end face of the coil or the housing thereof and the second counter-bearing, which is disposed at a second end portion of the pole tube, wherein the elastic element is a disk spring, which is supported on a retaining ring inserted in an annular groove, and wherein the electromagnet includes a rotation lock, which has a toothing constituted between an outer circumferential surface portion of the pole tube and an inner circumferential portion of the disk spring and has a further toothing constituted between a bearing contact portion of the disk spring and the second end face of the coil or of the housing thereof.

2. The electromagnet as claimed in claim 1, the toothing being constituted, between the bearing contact portion of the disk spring and the second end face of the coil or of the housing thereof, by radial recesses of the end face and by corresponding radial projections of the bearing contact portion, or by radial projections of the end face and by corresponding radial recesses of the bearing contact portion, and the recesses and projections being distributed in a uniform manner on the respective circumference.

3. An electromagnet comprising:
a pole tube including (i) a first end portion having a first counter-bearing surface and (ii) a second end portion having a second counter-bearing surface;
a coil encompassing the pole tube and being mounted displaceably along a longitudinal axis of the pole tube, a first end face of the coil or of a coil housing bearing on the first counter-bearing surface of the pole tube, and
an elastic element supported on the second counter-bearing surface between a second end face of the coil or of the coil housing and the second counter-bearing surface,
wherein the elastic element is configured to bias the coil and/or the coil housing against the first counter-bearing surface,
wherein the elastic element includes a disk spring supported on a retaining ring inserted in an annular groove, and
wherein the disk spring, the second end portion of the pole tube and the coil housing are configured such that, when in a mounted state, the disk spring prevents the coil housing from rotating at said second end portion.

4. The electromagnet as claimed in claim 3 for actuating a valve body of a hydraulic valve, the first counter-bearing surface being defined by an outer wall of a valve housing connected to the first end portion of the pole tube.

5. The electromagnet as claimed in claim 4, wherein the hydraulic valve is disposed on a mobile work device.

6. The electromagnet as claimed in claim 3, the second counter-bearing surface including one or more side flanks of one or more grooves of the pole tube.

7. The electromagnet as claimed in claim 3, further comprising:
a sealing ring disposed between the elastic element and the coil or the coil housing,
wherein the sealing ring is biased against the second end face by the elastic element.

8. The electromagnet as claimed in claim 3, wherein the second end portion of the pole tube has one or more key surfaces.

9. The electromagnet as claimed in claim 8, edges of the one or more key surfaces being breached by respectively one groove portion extending in the circumferential direction on the outer circumferential surface of the second end portion.

10. The electromagnet as claimed in claim 9, the groove portions constituting an annular groove, at least partially interrupted in the circumferential direction, for receiving the retaining ring.

11. The electromagnet as claimed in claim 3, the disk spring having, at its peripheral portion that bears on the coil housing, at least one radially and/or axially projecting tab, the projecting tab engaging in a hollow of the coil housing.

* * * * *